(12) United States Patent
Shibata et al.

(10) Patent No.: US 9,280,807 B2
(45) Date of Patent: Mar. 8, 2016

(54) DEGRADATION RESTORATION SYSTEM, DEGRADATION RESTORATION METHOD AND PROGRAM

(75) Inventors: Takashi Shibata, Tokyo (JP); Akihiko Iketani, Tokyo (JP); Shuji Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 78 days.

(21) Appl. No.: 14/233,973

(22) PCT Filed: Jun. 21, 2012

(86) PCT No.: PCT/JP2012/065921
§ 371 (c)(1),
(2), (4) Date: Jul. 14, 2014

(87) PCT Pub. No.: WO2013/011797
PCT Pub. Date: Jan. 24, 2013

(65) Prior Publication Data
US 2014/0355900 A1    Dec. 4, 2014

(30) Foreign Application Priority Data
Jul. 21, 2011    (JP) ................................. 2011-159564

(51) Int. Cl.
*G06K 9/40* (2006.01)
*G06T 5/00* (2006.01)
*H04N 5/217* (2011.01)

(52) U.S. Cl.
CPC ................. *G06T 5/003* (2013.01); *G06T 5/002* (2013.01); *G06T 2207/20192* (2013.01); *H04N 5/217* (2013.01)

(58) Field of Classification Search
None
See application file for complete search history.

(56) References Cited

U.S. PATENT DOCUMENTS 7,181,066 B1 *   2/2007   Wagman et al. ............... 382/183
8,265,393 B2 *   9/2012   Tribelhorn et al. ........... 382/173
(Continued)

FOREIGN PATENT DOCUMENTS

JP    2010-068084    3/2010
JP    2011-015228    1/2011

OTHER PUBLICATIONS

International Search Report corresponding to PCT/JP2012/065921, dated Jul. 19, 2012, 3 pages.
(Continued)

*Primary Examiner* — Eueng-Nan Yeh
(74) *Attorney, Agent, or Firm* — Wilmer Cutler Pickering Hale and Dorr LLP

(57) ABSTRACT

For each pixel of an input image, a direction toward which variation in pixel value between the relevant pixel and its peripheral pixels is largest and an amount of the variation in pixel value are computed, where a direction unit vector that indicates the direction toward which the variation is largest and a variation vector that represents the amount of the largest variation in the pixel value are computed. For each pixel, a regularization strength is computed utilizing the direction unit vector, the variation vector, and a regularization strength computing formula so that the larger the amount of the variation in pixel value toward a direction indicated by the direction unit vector, the less the regularization strength. An optimization function is determined based on the input image and the regularization strength for each pixel thereof and assigns a value for each pixel, by which the determined optimization function has the minimum value, to the corresponding pixel of a restored image to be generated.

6 Claims, 4 Drawing Sheets

(56) References Cited

U.S. PATENT DOCUMENTS

2004/0153128 A1* 8/2004 Suresh et al. .................. 607/14
2010/0061652 A1   3/2010 Takeshima et al.

OTHER PUBLICATIONS

Written Opinion of the International Search Authority corresponding to PCT/JP2012/065921, mailing date Jul. 31, 2012, 3 pages.

* cited by examiner

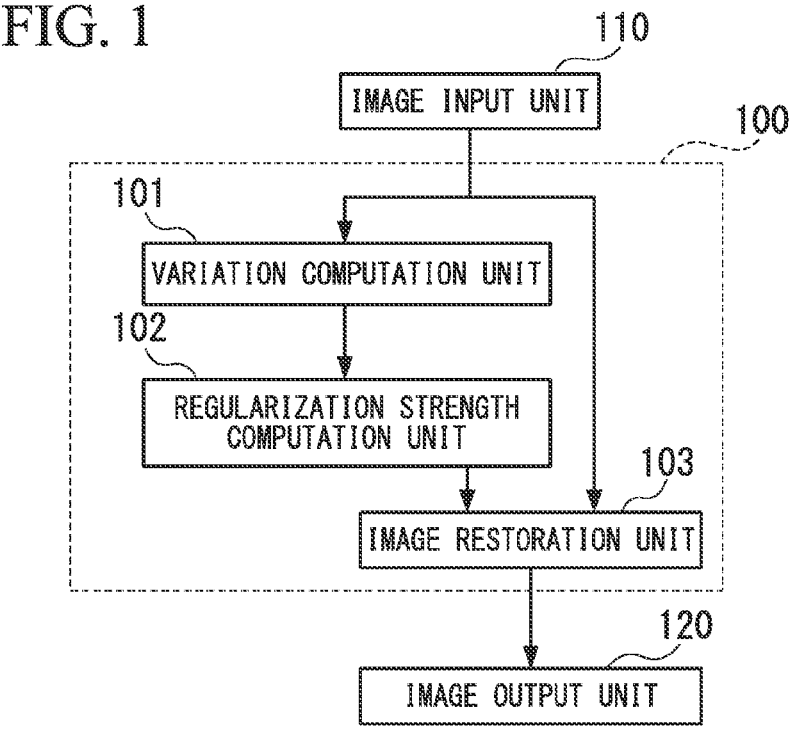
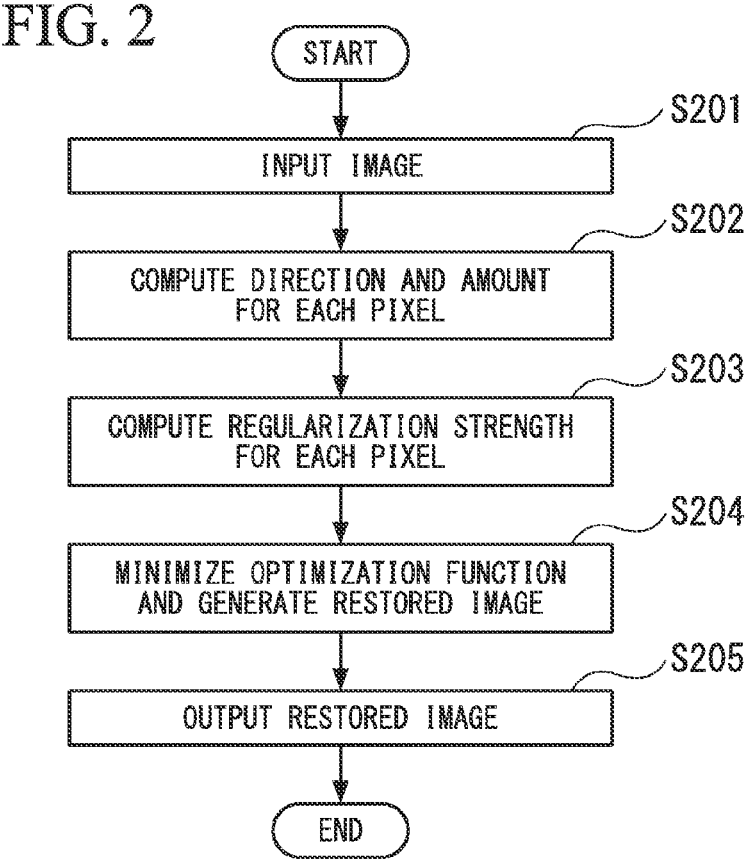

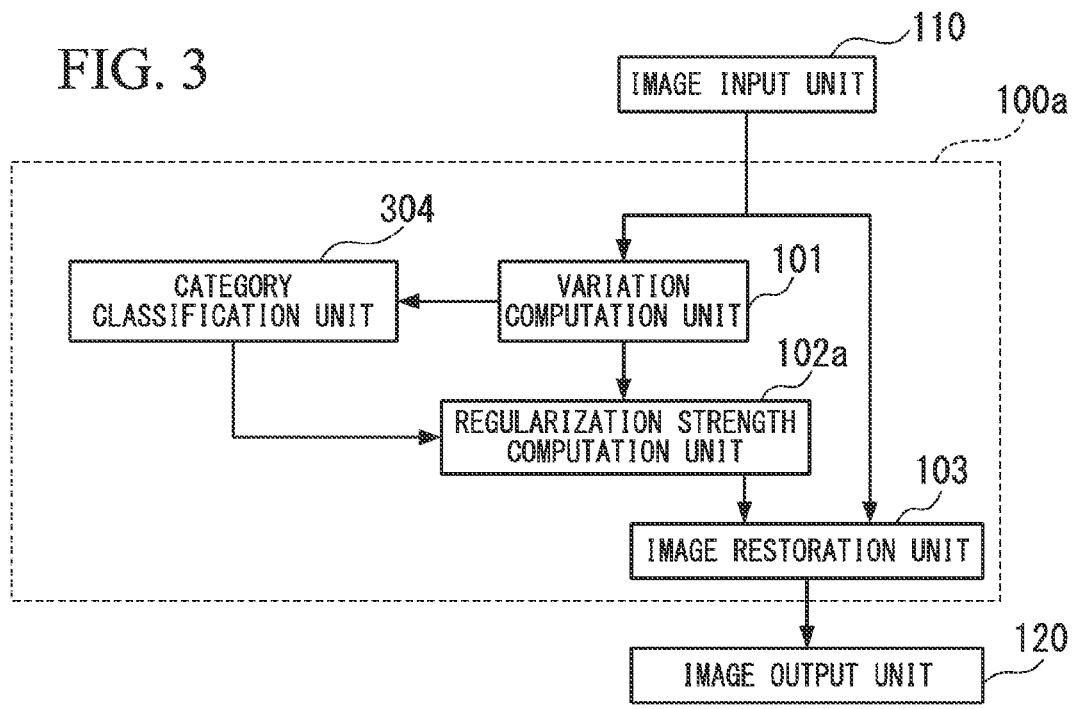
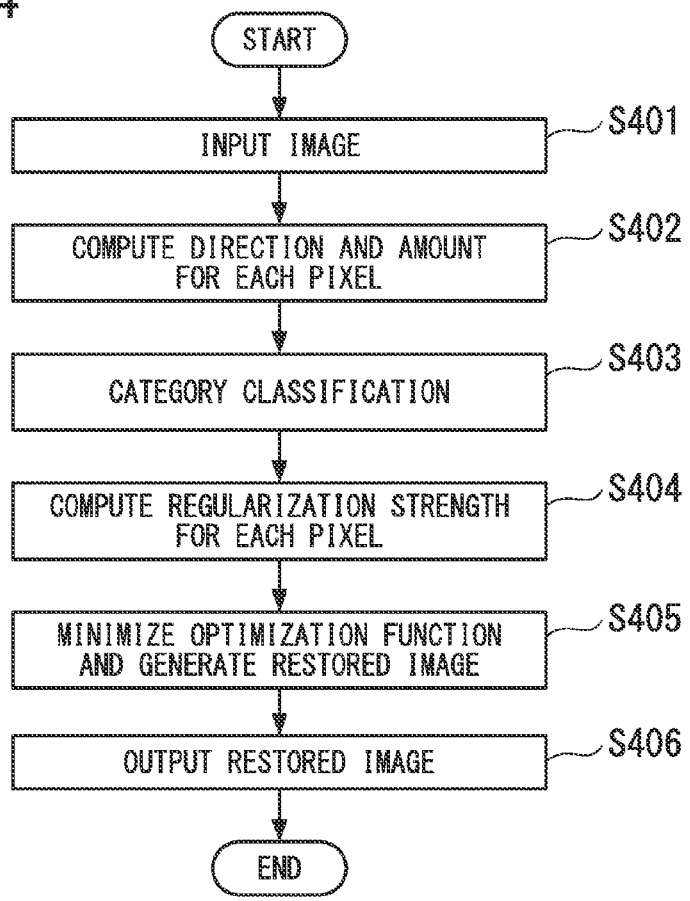

DEGRADATION RESTORATION SYSTEM, DEGRADATION RESTORATION METHOD AND PROGRAM

CROSS-REFERENCE TO RELATED APPLICATIONS

This application is a national stage application of International Application No. PCT/JP2012/065921 entitled "Degradation Restoration System, Degradation Restoration Method and Program," filed on Jun. 21, 2012, which claims the benefit of the priority of Japanese Patent Application No. 2011-159564, filed on Jul. 21, 2011, the disclosures of each of which are hereby incorporated by reference in their entirety.

TECHNICAL FIELD

The present invention relates to a degradation restoration system, a degradation restoration method and a program, and in particular, relates to those preferably utilized to restore a high resolution image from a low resolution image.

BACKGROUND ART

In a popular way to restore an image which has been degraded due to blurring, noise, resolution reduction, or the like, an image is generated utilizing a simulation to apply a degradation process such as blurring to a restored image, and difference between the generated image and the degraded image (i.e., input image) is minimized so as to generate the restored image. However, there are an infinite number of solutions (i.e., pixel values) as candidates for such a restored image, and a unique solution cannot be determined. In order to determine a unique solution, regularization to constrain the solution must be performed. For example, a regularization to reduce a variation in the pixel value between neighboring pixels in the restored image is performed to determine a unique solution.

Patent Document 1 discloses a solution regularization method performed in a manner such that when there is a large difference in the pixel value between neighboring pixels in an input image, the restored image has also a large difference in the pixel value between corresponding neighboring pixels (see, for example, paragraph [0030] of Patent Document 1).

More specifically, first, if there is a large difference in the pixel value between neighboring pixels that form an input image, strength for regularization (called "regularization strength" below) is adaptively assigned to each pixel so as to reduce the regularization strength. Next, the following optimization function E([X]) utilizing the determined regularization strength is determined, and an argument to minimize the value of the above optimization function E([X]) is searched for. Then, a restored image having pixel values given by the argument is generated. In the present application, a vector variable is represented by interposing it between brackets "[ ]" or using a bold font. For example, a variable [X] and a boldfaced variable X in the following formula are the same vector variable:

[Formula 1]

$$E(X) = E_{data}(X) + E_{reg}(X) \quad (1)$$

Here, [X] is a column vector consisting of values of individual pixels, which are arranged in raster scan order. For example, when the number of pixels of the restored image is M, $[X] = (X_1, \ldots, X_i, \ldots, X_M)^t$.

$E_{data}([X])$ is called an "error term" and indicates an relationship between an input image and a restored image therefor.

$E_{reg}([X])$ is called a "regularization term" and restricts the pixel value computed by the optimization function.

In Patent Document 1, the pixel value computed by the optimization function is restricted to uniformly reduce difference between the pixel values of neighboring pixels values, where the following function is utilized as the regularization term $E_{reg}([X])$ (see paragraphs [0067] to [0068] of Patent Document 1).

[Formula 2]

$$E_{reg}(X) = \sum_i g_i \cdot (4X_i - X_{i+1} - X_{i-1} - X_{i+width} - X_{i-width}) \quad (2)$$

Here, $X_{i+1}$, $X_{i-1}$, $X_{i+width}$, and $X_{i-width}$ respectively represent upper, lower, left, and right pixels around the ith pixel. Additionally, $g_i$ denotes regularization strength.

When the regularization strength $g_i$ is adaptively determined for each pixel, it is possible to perform degradation restoration while maintaining sharpness (i.e., amount of difference between pixel values) of the image of a region where difference in the pixel value between neighboring pixels is large.

PRIOR ART DOCUMENT

Patent Document

Patent Document 1: Japanese Unexamined Patent Application, First Publication No. 2010-068084.

DISCLOSURE OF INVENTION

Problem to be Solved by the Invention

However, the method disclosed in Patent Document 1 has a problem such that it cannot perform degradation restoration while maintaining the direction of a contour (i.e., edge) that indicates a boundary at which the pixel values of the relevant input image vary considerably. This is because the method disclosed in Patent Document 1 performs the restoration utilizing a regularization term that does not consider the direction of a variation in the pixel value of the input image.

That is, when the amount of difference in the pixel value between neighboring pixels is large, solution constraint is performed so that the restored image also has a large amount of difference in the pixel value between the corresponding neighboring pixels. In this process, a direction toward which the difference in the pixel value should be increased is not considered.

An object of the present invention is to provide a degradation restoration system, a degradation restoration method and a program, which can solve the above problem.

Means for Solving the Problem

The present invention provides a degradation restoration system that generates a restored image based on an optimization function which includes a plurality of regularization terms, that reduce variation in pixel value of the restored image toward different directions assigned to the individual regularization terms, and an error term where the smaller the difference between an input image and an image obtained by virtually degrading the restored image in accordance with a pre-assumed degradation step, the less the value of the error term, wherein the system comprises:

(i) a variation computation unit that computes, for each pixel of the input image, a direction toward which variation in pixel value between the relevant pixel and its peripheral pixels is largest and an amount of the variation in pixel value between the relevant pixel and its peripheral pixels, where the variation computation unit computes a direction unit vector that indicates, for each pixel, the direction toward which the variation is largest and a variation vector that represents, for each pixel, the amount of the largest variation between the relevant pixel and its peripheral pixels;

(ii) a regularization strength computation unit that computes, for each pixel, a regularization strength utilizing the direction unit vector, the variation vector, and a regularization strength computing formula in a manner such that the greater the degree of coincidence between a direction toward which each regularization term reduces the variation in pixel value and a direction of the variation in pixel value, which is indicated by the direction unit vector computed by the variation computation unit, and also the larger the amount of the variation in pixel value, the less the regularization strength; and (iii) an image restoration unit that determines the optimization function based on the input image and the regularization strength assigned to each pixel of the input image and assigns a value for each pixel, by which the determined optimization function has the minimum value, to the corresponding pixel of the restored image so as to generate the restored image.

Effect of the Invention

In accordance with the present invention, it is possible to generate a restored image which maintains an image having a clear contour (edge) that indicates a boundary by which different regions in the image (e.g., different objects or figures present in the input image) are distinguishable.

BRIEF DESCRIPTION OF THE DRAWINGS

FIG. 1 is a block diagram showing the structure of a first embodiment of the present invention.

FIG. 2 is a flowchart that shows the operation of the first embodiment shown in FIG. 1.

FIG. 3 is a block diagram showing the structure of a second embodiment of the present invention.

FIG. 4 is a flowchart that shows the operation of the second embodiment shown in FIG. 3.

MODE FOR CARRYING OUT THE INVENTION

Figure 5:
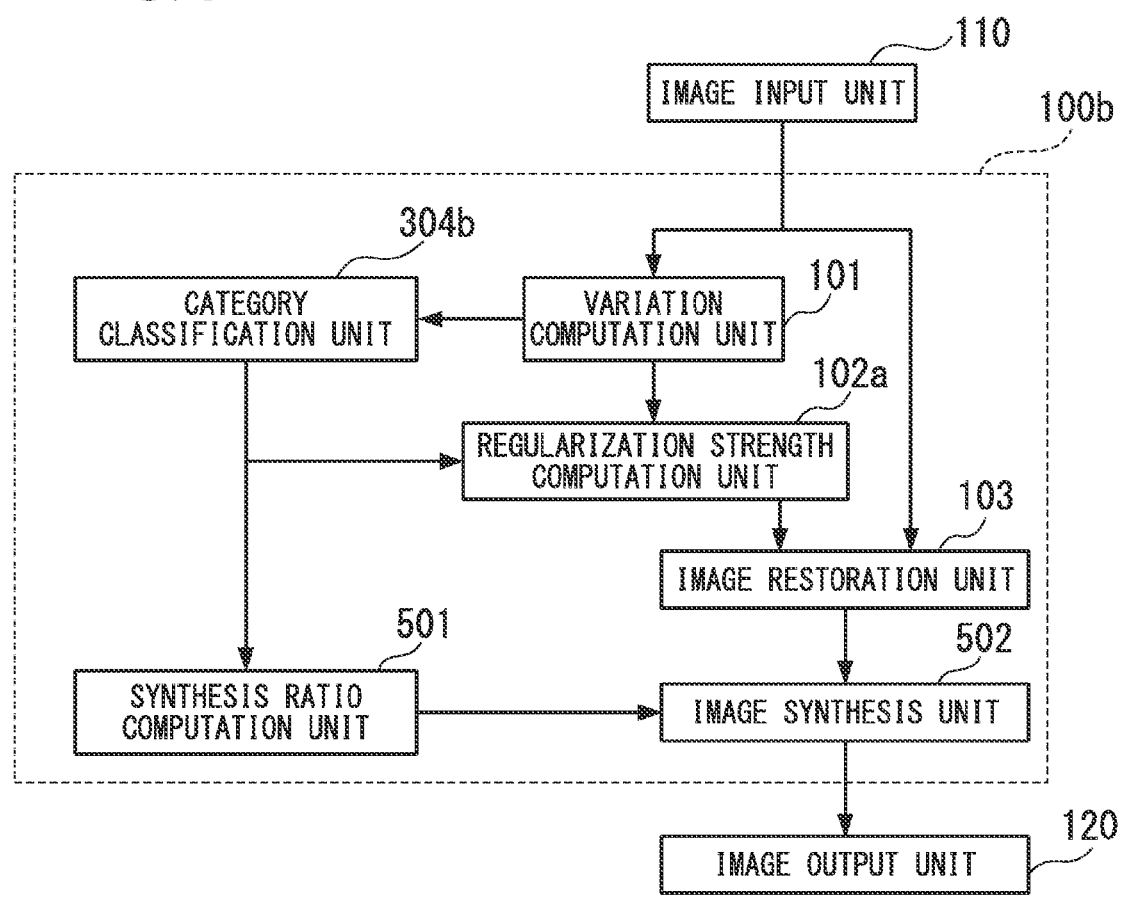
FIG. 5 is a block diagram showing the structure of a third embodiment of the present invention.

Below, embodiments for implementing the present invention will be explained in detail with reference to the drawings.

First Embodiment

Referring to FIG. 1, an image processing system in accordance with a first embodiment of the present invention has a computer 100 (that may be a central processing unit, a processor, or a data processing unit) which operates utilizing a program control, an image input unit 110, and an image output unit 120.

The computer 100 includes a variation computation unit 101, a regularization strength computation unit 102, and an image restoration unit 103. These units 101 to 103 each operate by executing a specific program in the computer 100. Generally, they operate as explained below.

An image obtained using a camera or a scanner is input into the image input unit 110 which stores the image in a memory (not shown).

The pixel values of individual pixels of the image input via the image input unit 110 are represented utilizing a column vector [Y] where the pixel values are arranged in raster scan order. Additionally, this vector is called an "input image vector [Y]".

For example, when the number of pixels of the input image is M, the input image vector $[Y]=(Y_1, \ldots, Y_i, \ldots, Y_M)^t$, where a subscript "t" means a transposed matrix.

Similar to the input image, the pixel values of individual pixels in a restored image are represented utilizing a column vector where the pixel values are arranged in raster scan order. Additionally, this vector is called a "restored image vector [X]".

For example, when the number of pixels of the restored image is M', the restored image vector $[X]=(X_1, \ldots, X_i, \ldots, X_{M'})^t$.

Below, the input image and the restored image has the same number of pixels (i.e., M=M'). However, the present invention is not limited to this condition.

The variation computation unit 101 computes, for each pixel, (i) a direction toward which a variation in the pixel value between a pixel and its peripheral pixels in the input image is largest, and (ii) the amount of variation in the pixel value between the relevant pixel and its peripheral pixels. The variation computation unit 101 stores the computed values in the memory (not shown).

Below, $dY_i$ denotes the largest value of variation between the ith pixel and its peripheral pixels, and a column vector that arranges such largest values in raster scan order is represented by:

$[dY]=(dY_1, \ldots, dY_i, \ldots, dY_M)^t$.

The above vector is called a "variation vector".

In addition, the direction of the variation for the ith pixel is represented as a unit vector $[N]_i=(N_{xi}, N_{yi})$, and [N] denotes an M×2 matrix in which such unit vectors are arranged in column direction in raster scan order.

Below, methods of computing the variation vector [dY] and the direction unit vector [n] will be explained in detail.

First, the method of computing the variation vector [dY] will be explained.

The variation vector [dY] can be determined in a manner such that the larger the absolute value of each pixel value of the following image, the larger the corresponding element of the variation vector [dY]. The relevant image is obtained by subjecting the input image to a product-sum operation utilizing a filter such as a Sobel filter, a Prewitt filter, or a Laplacian filter. Below, an example utilizing a Sobel filter will be explained.

That is, an image is obtained by subjecting the input image to the product-sum operation utilizing a Sobel filter, and the pixel values of individual pixels in the obtained image are arranged in raster scan order to produce column vectors which are an x-direction variation vector $[Y_x]$ and a y-direction variation vector $[Y_y]$.

For example, when the number of pixels in the input image is M:

x-direction variation vector $[Y_x]=(Y_{x1}, \ldots, Y_{xi}, \ldots, Y_{xM})^t$, and y-direction variation vector $[Y_y]=(Y_{y1}, \ldots, Y_{yi}, \ldots, Y_{yM})^t$.

Here, the amount of variation $dY_i$ in the pixel value for pixel i is defined utilizing $Y_{xi}$ and $Y_{yi}$ as follows.

[Formula 3]

$$dY_i = (Y_{xi}^2 + Y_{yi}^2)^{\frac{1}{2}} \qquad (3)$$

On the other hand, the method of computing the direction of the variation in the pixel value computes a direction toward which the pixel value has varied most based on the previously-computed amounts of variation in the pixel value in the x and y directions. For example, regarding the direction of the variation in the pixel value of the ith pixel, the direction unit vector $[N]_i = (N_{xi}, N_{yi})$ is computed utilizing the amounts $Y_{xi}$, $Y_{yi}$, and $dY_i$ of variation in the pixel value for the ith pixel, as follows.

[Formula 4]

$$N_{xi} = \frac{Y_{xi}}{dY_i} \qquad (4)$$

$$N_{yi} = \frac{Y_{yi}}{dY_i}$$

The variation computation unit 101 stores the computed variation vector [dY] and the direction unit vector [N] (not shown) in the memory (not shown).

In the above explanation, the variation computation unit 101 computes the direction and amount of the variation in the pixel value of the input image are computed for each relevant. However, the present invention is not limited to this condition.

For example, the variation computation unit 101 may compute an edge segment and the amount and direction of the variation in the pixel value for a larger scale (that is, a group of pixels as a unit to be processed), and the computed results may be stored in the memory (not shown).

In order to detect an edge segment, the following method may be utilized.

First, for a mask image having a pixel value 1 that indicates presence of the edge segment and a pixel value 0 that indicates absence of the edge segment, the pixel values thereof are arranged in raster scan order to generate a column vector $[E] = (E_1, \ldots, E_i, \ldots, E_M)^t$. Then information of this column vector $[E] = (E_1, \ldots, E_i, \ldots, E_M)^t$ is stored in the memory (not shown).

In another example, a column vector [E] may be generated by arranging the values of individual pixels of an image, that is obtained by subjecting the above-mentioned mask image to a product-sum operation utilizing a Gaussian filter, in raster scan order, and the generated result may be stored in the memory (not shown).

In order to detect the edge segment, a Canny edge detection algorithm or the like may be utilized.

Additionally, in order to compute the variation in the pixel value and its direction for a larger scale pertaining to pixel i, for example, the ith pixel and its peripheral pixels are targeted, and averages $dy_i$ and $[n]_i = (nx_i, ny_i)$ (pertaining to the amount and direction of the variation) for the targeted pixels are computed. Such values are computed for each pixel, and a column vector [dy] and a matrix [n] are generated by arranging the relevant values in raster scan order. The generated results are stored in the memory (not shown).

In the above explanation, the variation computation unit 101 computes the edge segment and the direction and amount of the variation in the pixel value for a larger scale. However, the present invention is not limited to this manner.

For example, the variation computation unit 101 may compute the amount and direction of the variation in the pixel value for different scales, and the computed results may be stored in the memory (not shown).

In a specific example explained below, the amount and direction of the variation in the pixel value for L different scales are computed. In the following explanation, the scale is represented utilizing a distance between pixels. However, the present invention is not limited to such a manner.

The L different scales are represented by a vector $[R] = (R_1, \ldots, R_l, \ldots, R_L)$ that includes different distances. For example, the lth smallest scale of the L scales is $R_l$. Below, a method of computing the amount and direction of the variation in the pixel value for the lth smallest scale will be explained.

First, a Sobel filter in the x and y directions is enlarged $R_l$ times by means of interpolation. Next, an image is generated by subjecting an input image to a product-sum operation utilizing the enlarged filter utilizing the interpolation. Here, the pixel values of the individual pixels are arranged in raster scan order to obtain column vectors such as an x-direction variation vector $[y_{xl}]$ and a y-direction variation vector $[y_{yl}]$.

For example, when the number of pixels in the input image is M:

x-direction variation vector $[Y_{xl}] = (y_{xl1}, \ldots, y_{xli}, \ldots, y_{xlM})^t$, and y-direction variation vector $[Y_{yl}] = (y_{yl1}, \ldots, y_{yli}, \ldots, y_{ylM})^t$.

Here, the amount of variation $dy_{li}$ in the pixel value for pixel i is defined utilizing $y_{xli}$ and $y_{yli}$ as follows.

[Formula 5]

$$dy_{li} = (y_{xli}^2 + y_{yli}^2)^{\frac{1}{2}} \qquad (5)$$

The values $dy_{li}$ for the individual pixels are arranged in raster scan order to generate a column vector $[dy_l]$, which is stored in the memory (not shown).

On the other hand, the method of computing the direction of the variation in the pixel value computes a direction toward which the pixel value has varied most based on the previously-computed amounts of variation in the pixel value in the x and y directions.

For example, regarding the direction of the variation in the pixel value of the ith pixel, the direction unit vector $[n]_{li} = (n_{xli}, n_{yli})$ is computed utilizing the amounts $y_{xli}$, $y_{yli}$, and $dy_{li}$ of variation in the pixel value for the ith pixel, as follows.

[Formula 6]

$$n_{xli} = \frac{y_{xli}}{dy_{li}} \qquad (6)$$

$$n_{yli} = \frac{y_{yli}}{dy_{li}}$$

The computed results are stored in the memory (not shown).

The method of computing the amount and direction of the variation in the pixel value for L different scales is not limited to the above.

For example, the amount and direction of the variation in the pixel value of the ith pixel for the lth smallest scale may be computed as averages (for the amount and direction of the variation in the pixel value) among all pixels whose distance from the ith pixel is $R_l$ or shorter.

Next, the operation of the regularization strength computation unit 102 will be explained.

As described later, in the present invention, a plurality of regularization terms are utilized. The regularization terms are utilized to reduce the variation in the pixel value in different specific directions, and thus to reduce the variation in the pixel value between peripheral pixels in a restored image.

For example, a regularization term is a value utilized by an image restoration device so as to reduce the variation in the pixel value between peripheral pixels in the x direction. Additionally, another regularization term is a value utilized by the image restoration device so as to reduce the variation in the pixel value between the peripheral pixels in the y direction.

The regularization strength computation unit 102 computes such a strength of each regularization term (i.e., regularization strength) for each pixel in a manner such that (i) the direction of the variation in the pixel value, which is indicated by the direction unit vector computed by the variation computation unit 101, is equal to the direction in which the variation in the pixel value is reduced by the relevant regularization term, and (ii) the larger the amount of variation in the pixel value, the smaller the regularization strength.

Below, when the number of the regularization terms is K and the number of the pixels of the input image is M, the kth regularization term (where k=1, . . . , k, . . . , K) applied to the ith pixel is represented by $W_{ki}$, and a column vector (regularization strength vector) obtained by arranging the regularization strengths of the individual pixels in raster scan order is represented by $[W]_k = (W_{k1}, \ldots, W_{ki}, \ldots, W_{kM})^t$.

If the variation computation unit 101 computes only the amount and direction of the variation in the pixel value, the regularization strength $W_{ki}$ of the ith pixel may be defined utilizing amount $dY_i$ and direction $[N]_i$ of the variation in the pixel value as follows.

[Formula 7]

$$W_{ki} = \lambda + \alpha \cdot f(dY_i) + \beta \cdot g(dY_i, N_i) \quad (7)$$

Here, $\lambda$, $\alpha$, and $\beta$ are constants predetermined by a user.

In addition, $f(dY_i)$ is a function having a value greater than 0 where the greater the value of $dY_i$ that indicates the amount of variation for the ith pixel, the less the value of the function. For example, $f(dY_i)$ may be as follows:

[Formula 8]

$$f(dY_i) = \sigma(D \cdot |dY_i|^{-1}) \quad (8)$$

Here, $\sigma(\cdot)$ is a function that outputs 1 if the input value (argument) is greater than 1, otherwise the function outputs the input value. D is a constant predetermined by a user.

Similar to $f(dY_i)$, $g(dY_i, [N]_i)$ is a function having a value greater than 0 where the greater the value of $dY_i$ that indicates the amount of variation for the ith pixel, the less the value of the function.

The function $g(dY_i, [N]_i)$ also has a feature such that the greater the degree of coincidence between the direction toward which the variation in the pixel value between peripheral pixels is reduced by the kth regularization term and direction $[N]_i$ of the variation of the ith pixel, the less the value of the function.

For example, when reducing the variation in the pixel value between peripheral pixels in the x direction by means of the kth regularization term, $g(dY_i, [N]_i)$ may be defined as follows.

[Formula 9]

$$g(dY_i, N_i) = \sigma(D \cdot |dY_i \cdot N_{xi}|^{-1}) \quad (9)$$

More generally, when reducing the variation in the pixel value between peripheral pixels in a direction indicated by a unit vector $[s] = (s_x, s_y)$ (for example, the x direction is represented by $[s] = (1, 0)$), $g(dY_i, [N]_i)$ may be defined as follows.

[Formula 10]

$$g(dY_i, N_i) = \sigma(D \cdot |dY_i \cdot (s_x N_{xi} + s_y N_{yi})|^{-1}) \quad (10)$$

If computing, in addition to the amount and direction of the variation in the pixel value computed by the variation computation unit 101, a vector that represents the amount and direction of the variation in the pixel value for a larger scale and the presence or absence of an edge segment, the ith regularization strength $W_{ki}$ may be defined utilizing $dY_i$, $[N]_i$, $[n]_i$, $dy_i$, and $E_i$, as follows.

[Formula 11]

$$W_{ki} = \lambda + \alpha \cdot f(dY_i) + \beta \cdot g(dy_i, n_i) + \gamma \cdot h(dY_i, N_i, E_i) \quad (11)$$

Here, $\lambda$, $\alpha$, $\beta$, and $\gamma$ are constants predetermined by a user.

Similar to Formula (8), $f(dY_i)$ is a function having a value greater than 0 where the greater the value of $dY_i$, the less the value of the function.

Additionally, similar to Formula (9), $g(dy_i, [n]_i)$ is a function having a value greater than 0 where the greater the value of $dy_i$, the less the value of the function.

The function $g(dy_i, [n]_i)$ also has a feature such that the greater the degree of coincidence between the direction toward which the variation in the pixel value between peripheral pixels is reduced by the kth regularization term and direction $[n]_i$, the less the value of the function.

For example, when reducing the variation in the pixel value between peripheral pixels in the x direction by means of the kth regularization term, $g(dy_i, [n]_i)$ may be defined as follows.

[Formula 12]

$$g(dy_i, n_i) = \sigma(D \cdot |dy_i \cdot n_{xi}|^{-1}) \quad (12)$$

In the above Formula (11), $h(dY_i, [N]_i, E_i)$ is a function where (i) the greater the amount $dY_i$ of variation for the ith pixel, the less the value of the function, (ii) the greater the degree of coincidence between the direction toward which the variation in the pixel value between peripheral pixels is reduced by the kth regularization term and direction $[N]_i$ of variation for the ith pixel, the less the value of the function, and (iii) the greater the value $E_i$ of pixel i in the above-described mask image, the less the value of the function.

For example, when reducing the variation in the pixel value between peripheral pixels in the x direction by means of the kth regularization term, $h(dY_i, [N]_i, E_i)$ may be defined as follows.

[Formula 13]

$$h(dY_i, N_i, E_i) = \sigma(D \cdot |dY_i \cdot N_{xi}|^{-1} \cdot E_i^{-1}) \quad (13)$$

When the variation computation unit 101 computes the amount and direction of the variation in the pixel value for different scales, the regularization strength of the ith pixel in the kth regularization term is represented by $W_{ki}$. If the kth regularization term operates to reduce a variation in the pixel value between pixels apart from each other by distance $R_l$ toward a direction indicated by a unit vector $[s]=(s_x, s_y)$, then the regularization strength $W_{ki}$ may be defined as follows.

[Formula 14]

$$W_{ki}=\lambda+\alpha \cdot f(dy_{li}, R_l)+\beta \cdot g(dy_{li}, n_{li}, R_l) \quad (14)$$

Here, $\lambda$, $\alpha$, and $\beta$ are constants predetermined by a user.

In addition, $f(dy_{li}, R_l)$ is a function having a value greater than 0 where (i) the greater the value of $dy_{li}$ that indicates the amount of variation for the ith pixel, the less the value of the function, and (ii) the greater the lth scale $R_l$, the less the value of the function.

For example, $f(dy_{li}, R_l)$ may be as follows:

[Formula 15]

$$f(dy_{li}, R_l)=\phi(R_l) \cdot \sigma(D \cdot |dy_{li}|^{-1}) \quad (15)$$

Here, $\phi(\cdot)$ is a decreasing function.

$\sigma(\cdot)$ is a function that that outputs 1 if the input value is greater than 1, otherwise the function outputs the input value. D is a constant predetermined by a user.

Similar to $f(dy_{li}, R_l)$, $g(dy_{li}, [n]_{li}, R_l)$ is a function having a value greater than 0 where (i) the greater the value of $dy_{li}$ that indicates the amount of variation for the ith pixel, the less the value of the function, and (ii) the greater the lth scale $R_l$, the less the value of the function.

Additionally, $g(dy_{li}, [n]_{li}, R_l)$ is a function having a feature such that the greater the degree of coincidence between the direction toward which the variation in the pixel value between peripheral pixels is reduced by the kth regularization term and direction $[n]_{li}$ of the variation of the ith pixel, the less the value of the function.

For example, when reducing the variation in the pixel value for a scale indicated by a distance $R_l$ between the relevant pixels in a direction indicated by a unit vector $[s]=(s_x, s_y)$, $g(dy_{li}, [n]_{li}, R_l)$ may be defined as follows.

[Formula 16]

$$g(dy_{li}, n_{li}, R_l)=\phi(R_l) \cdot \sigma(D \cdot |dy_{li} \cdot (s_x n_{xli}+s_y n_{yli})|^{-1}) \quad (16)$$

Based on the regularization strength for each pixel of the input image, which was computed by the regularization strength computation unit 102, the image restoration unit 103 determines the regularization term $E_{reg}([X])$ according to the regularization strength applied to the relevant pixel. The determined regularization term $E_{reg}([X])$ includes a component corresponding to the direction of the variation in the pixel value.

The image restoration unit 103 also determines the optimization function $E([X])$ that indicates the sum of the regularization term $E_{reg}([X])$ (determined for the input image input via the image input unit 110) and the error term $E_{data}([X])$.

The error term $E_{data}([X])$ is a function defined such that the smaller the difference between a simulated image and a degraded image (input image [Y]), the less the value of the function, where the simulated image is obtained by subjecting a restored image [X] (restored from the degraded image) to a simulation that simulates a degradation process (e.g., blur degradation).

[Formula 17]

$$E(X)=E_{data}(X)+t \cdot E_{reg}(X) \quad (17)$$

Here, t denotes a parameter predetermined by a user.

The error term $E_{data}([X])$ represents a relationship between the input image [Y] and the restored image [X] utilizing the input image [Y] and a blur matrix [B].

Generally, when obtaining an image, the image is blurred due to defocusing of a lens in an optical system or camera shake. The blur function is a function that indicates such an image burring effect. For example, a PSF (Point Spread Function) may be utilized as the blur function. However, the blur function is not limited to the PSF and may be another function which indicates the degree of blurring in a blurred image. The blur function is a predetermined function designated by a user. Below, blurring indicated by a blur function is represented by a matrix [B] of N×N.

In addition, a column vector obtained by arranging the pixel values of individual pixels in an image having M pixels is denoted by [Z], and a column vector obtained by arranging the pixel values of individual pixels in the image [Z] which has been blurred by a given blur function is denoted by $[Z]_b$.

Here, the relationship between the column vector [Z] and the column vector $[Z]_b$ is represented utilizing [B] as the following formula (18).

[Formula 18]

$$Z_b = B \cdot Z \quad (18)$$

In other words, the column vector [Z] represents a non-blurred image while the column vector $[Z]_b$ represents a blurred image. Since the input image [Y] is a blurred image (degraded image), it corresponds to the column vector $[Z]_b$.

The error term $E_{data}([X])$ is a function that includes [Y], [X], and [B], where [X] indicates a restored image. The error term $E_{data}([X])$ is also a function defined such that the smaller the difference between an image obtained by blurring the restored image [X] utilizing the blur function [B] and the input image, the less the value of the function.

For example, the error term $E_{data}([X])$ is predefined by the following relational expression (formula) (19).

[Formula 19]

$$E_{data}(X)=\|B \cdot X - Y\|_p^p \quad (19)$$

Here, p is a parameter predetermined by a user.

In addition, $\|\cdot\|$ indicates a norm of a vector, and Formula (19) indicates an Lp norm.

On the other hand, $E_{reg}([X])$ may be represented utilizing K regularization terms as follows.

[Formula 20]

$$E_{reg}(X) = \left\| \sum_k \{L_k \cdot X\}^t \cdot diag(W_k) \cdot \{L_k \cdot X\} \right\|_p^p \quad (20)$$

Here, $[L]_k$ is a filter utilized to measure the amount of variation toward a specific direction. For example, $[L]_k$ is a Sobel filter, a Prewitt filter, or a Laplacian filter.

$[W]k$ is the kth regularization strength computed by the regularization strength computation unit 102, and "diag" denotes a diagonal matrix.

In the present embodiment, $[L]_k$ is not limited to a filter utilized to measure the amount of variation toward a specific direction. For example, $[L]_k$ may be a filter utilized to measure the amount of variation toward a specific direction for a specific scale.

For example, if the regularization strength $[W]_k$ operates to reduce a variation in the pixel value toward a direction indicated by a unit vector $[s]=(s_x, s_y)$ for a scale indicated by distance $R_l$ between pixels apart from each other by distance $R_l s_x$ in the x direction and distance $R_l s_y$ in the y direction.

For example, if $[s]=(1, 0)$ and $R_l=3$, $[L]_k$ is a filter as follows.

[Formula 21]

$$L_k = \begin{pmatrix} 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & -1 & 0 & 0 & 1 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{pmatrix} \quad (21)$$

The following formula may be utilized as the regularization term $E_{reg}([X])$.

[Formula 22]

$$E_{reg}(X) = \left\| \sum_k \operatorname{diag}(W_k) \cdot L_k \cdot X \right\|_p^p \quad (22)$$

The method for searching for [X] which minimizes the optimization function E([X]) may be a gradient method or a conjugate gradient method, by which each pixel value of the restored image can be obtained.

The image output unit 120 is an output unit that outputs the restored image [X] generated by the image restoration unit 103. The image output unit 120 may be implemented utilizing a display device.

Next, the operation of the first embodiment will be explained. FIG. 2 is a flowchart showing an example of the operation of the image processing system in the first embodiment.

First, when an image (degraded image) is input into the image input unit 110, the image input unit 110 stores the input image in the memory (not shown) (see step S201).

Next, the variation computation unit 101 retrieves the input image, which has been stored by the image input unit 110 in the memory (not shown), and computes the amount of variation in each pixel value of the input image by utilizing Formula (3). The variation computation unit 101 also computes the direction of the variation in the pixel value utilizing Formula (4) and stores the computed results in the memory (not shown) (see step S202).

In addition to the amount and direction of the variation in the pixel value between the relevant pixel and its peripheral pixels, the variation computation unit 101 may compute the amount and direction for a larger scale or detect the above-described edge segment in the relevant image and store the computed or detected result in the memory (not shown).

Based on the input image stored in the memory (not shown) by the image input unit 110 and the amount and direction of the variation between each pixel value of the input image and pixel values of its peripheral pixels stored in the memory (not shown) by the variation computation unit 101, the regularization strength computation unit 102 computes the regularization strength for each pixel and stores the computed result in the memory (not shown) (see step S203).

Here, the regularization strength is computed by substituting (i) the amount $dY_i$ of variation in the pixel value between each pixel in the input image and its peripheral pixels and the direction $[N]_i$ of the variation in the pixel value between said pixel and the peripheral pixels, (ii) $dy_i$ and $[n]_i$, or (iii) $dy_{li}$ and $[n]_{li}$ into some of formulas (7) to (16) or the like.

Next, the image restoration unit 103 determines the optimization function based on the input image stored in the memory (not shown) by the image input unit 110 and the regularization strength (for each pixel of the input image) stored in the memory (not shown) by the regularization strength computation unit 102. The image restoration unit 103 then generates a restored image having a value for each pixel, which minimizes the determined optimization function. The image restoration unit 103 stores the restored image in the memory (not shown) (see step S204).

Lastly, the image output unit 120 outputs the restored image, which was stored in the memory (not shown) by the image restoration unit 103, to a display device or the like.

Below, the effect of the present embodiment will be explained.

As described above, according to the present embodiment, the variation computation unit 101 computes the amount and direction of the variation in each pixel value of the input image and stores the computed values.

The regularization strength computation unit 102 adaptively determines for each pixel, the regularization strength by which (i) the direction toward which each regularization term reduces the variation in the pixel value between peripheral pixels in the restored image coincides with the direction of the variation in the pixel value indicated by the direction unit vector computed by the variation computation unit 101, and (ii) the larger the amount of the variation in the pixel value, the less the regularization strength.

Based on the regularization strength for each pixel of the input image, which was computed by the regularization strength computation unit 102, the image restoration unit 103 determines the regularization term $E_{reg}([X])$ in accordance with the regularization strength applied to the relevant pixel.

The image restoration unit 103 then determines the optimization function E([X]) that indicates the sum of the regularization term $E_{reg}([X])$ determined for the input image input via the image input unit 110 and the error term $E_{data}([X])$.

Next, the image restoration unit 103 computes [X] which minimizes the value of the optimization function E([X]). The image restoration unit 103 then outputs an image (as a restored image) having [X] as the pixel value of each pixel.

According to the above-described structure, a restored image is generated by which in a direction toward which the variation in the pixel value between peripheral pixels in the input image is large, such a variation in a region (that has a large variation in the pixel value between peripheral pixels in the input image) is large.

Therefore, it is possible to generate a restored image which maintains an image having a clear contour (edge) that indicates a boundary by which different regions in the image (e.g., different objects or figures present in the input image) are distinguishable.

Second Embodiment

Next, referring to FIG. 3, an image processing system in accordance with a second embodiment of the present invention will be explained. Here, structural elements similar to those in the first embodiment are given reference signs identical to those in FIG. 1 and explanations thereof are omitted.

FIG. 3 is a block diagram showing an example of the image processing system in the second embodiment. The present image processing system has an image input unit 110, a computer 100a which operates utilizing a program control, and an image output unit 120.

Similar to the first embodiment, the computer 100a may be called a central processing unit, a processor, or a data processing unit.

The computer 100a includes a variation computation unit 101, a regularization strength computation unit 102a, an image restoration unit 103, and a category classification unit 304.

Since the image input unit 110, the variation computation unit 101, the image restoration unit 103, and the image output unit 120 are similar to those of the first embodiment, explanations thereof are omitted.

Based on the direction of the variation in the pixel value indicated by the direction unit vector [N] and the amount of the variation in the pixel value indicated by the variation vector [dY], which are computed by the variation computation unit 101, the category classification unit 304 classifies the individual pixels into a plurality of categories predetermined by a user. The category classification unit 304 stores the classified results in the memory (not shown).

For example, when the variation computation unit 101 computes, for any pixel in the input image, amount $dY_i$ and direction $[N]_i$ of the variation in the pixel value, the individual pixels of the input image are classified into two types of regions such as a flat region and an edge region according to the amount $dY_i$ of variation.

More specifically, if the amount $dY_i$ of variation in the pixel value is greater than a threshold $dY_0$ predetermined by the user, the relevant pixel is classified into the edge region, and if $dY_i$ is less than $dY_0$, the pixel is classified into the flat region. Here, the edge region means a region that is recognizable to humans as a contour portion, and the flat region means a region that is recognizable to humans as being flat.

If the variation computation unit 101 has computed, not only the amount $dY_i$ and direction $[N]_i$ of the variation in the pixel value, but also a vector [E] that indicates presence or absence of the edge region, the individual pixels of the input image are classified into four types of regions such as the flat region, a texture region having no directionality, a texture region having a directionality, and the edge region (i.e., contour region) according to the computed values.

Here, the texture region having no directionality means a region that is recognizable to humans as having a specific texture having no directionality, and the texture region having a directionality means a region that is recognizable to humans as having a specific texture having a directionality.

More specifically, first, if the amount $dY_i$ of variation in the pixel value is less than a threshold $dY_0$ predetermined by the user, the relevant pixel is classified into the flat region.

If the amount $dY_i$ of variation in the pixel value is greater than or equal to $dY_0$ and the amount $dy_i$ of variation in the pixel value for a larger scale is less than a threshold $dy_0$ predetermined by the user, the relevant pixel is classified into the texture region having no directionality.

If the amount $dY_i$ of variation in the pixel value is greater than or equal to $dY_0$, the amount $dy_i$ of variation in the pixel value for a larger scale is greater than or equal to $dy_0$, and a value $E_i$ that indicates the presence or absence of the edge region is less than a threshold $E_0$ predetermined by the user, the relevant pixel is classified into the texture region having a directionality.

If the amount $dY_i$ of variation in the pixel value is greater than or equal to $dY_0$, the amount $dy_i$ of variation in the pixel value for a larger scale is greater than or equal to $dy_0$, and the value $E_i$ that indicates the presence or absence of the edge region is greater than or equal to $E_0$, the relevant pixel is classified into the edge region.

Based on the amount and direction of the variation in each pixel value of the input image, which were stored by the variation computation unit 101 in the memory, and the category stored in the category classification unit 304, the regularization strength computation unit 102a adaptively computes a plurality of types of regularization strength for each pixel and stores the computed result in the memory (not shown).

Below, similar to the first embodiment, when there are K types of regularization strength and the input image has M pixels, the kth regularization term (where k=1, ..., k, ..., K) applied to the ith pixel is represented by $W_{ki}$, and a column vector obtained by arranging the regularization strengths of the individual pixels in raster scan order is represented by $[W]_k = (W_{k1}, \ldots, W_{ki}, \ldots, W_{kM})^t$.

If the variation computation unit 101 stored only the amount $dY_i$ and direction $N_i$ of the variation in the pixel value in the memory, the regularization term $W_{ki}$ of the ith pixel may be defined as follows, similar to the first embodiment.

[Formula 23]

$$W_{ki} = \lambda + \alpha \cdot f(dY_i) + \beta \cdot g(dY_i, N_i) \quad (23)$$

Here, $\lambda$ denotes a parameter predetermined by a user.

Since $f(dY_i)$ and $g(dY_i, [N]_i)$ are similar to those in the first embodiment, explanations thereof are omitted.

The values of $\alpha$ and $\beta$ are determined based on the results of classification stored in the category classification unit 304. In the following case to be explained, the individual pixels have been classified into two categories such as the flat region and the edge region.

If the ith pixel has been classified into the flat region, $\alpha$ and $\beta$ are respectively set to larger and smaller values, for example, a and are respectively set to 1 and 0.

In contrast, if the ith pixel has been classified into the edge region, $\alpha$ and $\beta$ are respectively set to smaller and larger values, for example, $\alpha$ and $\beta$ are respectively set to 0 and 1.

That is, in order to isotropically reduce the variation in the pixel value between peripheral pixels utilizing the kth regularization strength, $f(dY_i)$ is increased. On the other hand, in order to reduce the variation toward the direction [N] in the pixel value between peripheral pixels utilizing the kth regularization strength, $g(dY_i, [N]_i)$ is increased.

Here, the flat region is a region where the variation in the pixel value is small in all directions. Therefore, $\alpha$ and $\beta$ are respectively set to 1 and 0 and $f(dY_i)$ is increased so that in a restored image, a flat region can be restored as a region where the variation in the pixel value is small in all directions.

On the other hand, the edge region is a region where the variation in the pixel value is small toward a specific direction. Therefore, $\alpha$ and $\beta$ are respectively set to 0 and 1 and $g(dY_i, [N]_i)$ is increased so that in a restored image, an edge region can be restored as a region where the variation toward direction [N] in the pixel value between peripheral pixels is small.

If the variation computation unit 101 has computed, not only the amount $dY_i$ and direction $[N]_i$ of the variation in the pixel value, but also the vector [E] that indicates the presence or absence of the edge region, the regularization term $W_{ki}$ of the ith pixel may be defined as follows, similar to the first embodiment.

[Formula 24]

$$W_{ki} = \lambda + \alpha \cdot f(dY_i) + \beta \cdot g(dy_i, n_i) + \gamma \cdot h(dY_i, N_i, E_i) \quad (24)$$

Here, $\lambda$ denotes a parameter predetermined by a user.

Since $f(dY_i)$, $g(dY_i, [N]_i)$, and $h(dY_i, [N]_i, E_i)$ are similar to those in the first embodiment, explanations thereof are omitted.

The values of α, β, and γ are determined based on the results of classification stored in the category classification unit 304. In the following case to be explained, the individual pixels have been classified into four categories such as the flat region, the texture region having no directionality, the texture region having a directionality, and the edge region.

If the ith pixel has been classified into the flat region, α is set to a larger value and β and γ are each set to a smaller value, for example, α, β, and γ are respectively set to 1, 0, and 0.

If the ith pixel has been classified into the texture region having no directionality, α, β, and γ are each set to a smaller value, for example, α, β, and γ are each set to 0.

If the ith pixel has been classified into the texture region having a directionality, α and γ are each set to a smaller value and β is set to a larger value, for example, α, β, and γ are respectively set to 0, 1, and 0.

If the ith pixel has been classified into the edge region, α and β are are each set to a smaller value and γ is set to a larger value, for example, α, β, and γ are respectively set to 0, 0, and 1.

That is, in order to isotropically reduce the variation in the pixel value between peripheral pixels utilizing the kth regularization strength, $f(dY_i)$ is increased.

On the other hand, in order to reduce the variation toward the direction [N] in the pixel value between peripheral pixels utilizing the kth regularization strength, $g(dY_i, [N]_i)$ is increased.

In addition, in order to reduce, only on the edge segment, the variation toward the direction [N] in the pixel value between peripheral pixels utilizing the kth regularization strength, $h(dY_i, [N]_i, E_i)$ is increased.

Here, the flat region is a region where the variation in the pixel value is small in all directions. Therefore, α, β, and γ are respectively set to 1, 0, and 0 and $f(dY_i)$ is increased so that in a restored image, a flat region can be restored as a region where the variation in the pixel value is small in all directions.

On the other hand, the texture region having a directionality is a region where the variation in the pixel value is small toward a specific direction. Therefore, α, β, and γ are respectively set to 0, 1, and 0 and $g(dY_i, [N]_i)$ is increased so that in a restored image, a texture region having a directionality can be restored as a region where the variation toward direction [N] in the pixel value between peripheral pixels is small.

In addition, the edge region is a region where the variation in the pixel value is small toward a specific direction only on the edge segment. Therefore, α, β, and γ are respectively set to 0, 0, and 1 and $h(dY_i, [N]_i, E_i)$ is increased so that in a restored image, an edge region can be restored as a region where the variation toward direction [N] in the pixel value between peripheral pixels is small only on the edge segment.

Below, the general operation of the present embodiment will be explained in detail with reference to FIG. 3 and a flowchart in FIG. 4.

First, when an image is input into the image input unit 110, the image input unit 110 stores the input image in the memory (not shown) (see step S401).

Next, the variation computation unit 101 retrieves the input image, which has been stored by the image input unit 110 in the memory (not shown), and computes the amount of variation in each pixel value of the input image by utilizing Formula (3). The variation computation unit 101 also computes the direction of the variation in the pixel value utilizing Formula (4) and stores the computed results in the memory (not shown) (see step S402).

In addition to the amount and direction of the variation in the pixel value between the relevant pixel and its peripheral pixels, the variation computation unit 101 may compute the amount and direction for a larger scale or detect the above-described edge segment in an image, and store the computed or detected result in the memory (not shown).

Next, the category classification unit 304 classifies the individual pixels of the input image into the flat region and the edge region based on the direction unit vector [N] and the variation vector [dY] for the pixels, which were stored by the variation computation unit 101 in the memory (not shown), and stores the classified results in the memory (not shown) (see step S403).

As described above, the category classification unit 304 may classify the individual pixels into the flat region, the texture region having no directionality, the texture region having a directionality, and the edge region based on the direction and amount for the image, which were stored by the variation computation unit 101 in the memory (not shown), and the category classification unit 304 may store the classified results in the memory (not shown).

Based on (i) the input image stored in the memory (not shown) by the image input unit 110, (ii) the amount and direction of the variation between each pixel value of the input image and pixel values of its peripheral pixels stored in the memory (not shown) by the variation computation unit 101, and (iii) the classified results for the individual pixels of the input image stored by the category classification unit 304 in the memory (not shown), the regularization strength computation unit 102a computes the regularization strength for each pixel and stores the computed result in the memory (not shown) (see step S404).

Next, the image restoration unit 103 determines the optimization function based on the input image stored in the memory (not shown) by the image input unit 110 and the regularization strength (for each pixel of the input image) stored in the memory (not shown) by the regularization strength computation unit 102a. The image restoration unit 103 then computes, for the relevant optimization function E([X]), the value [X] that minimizes the value of function E([X]). The image restoration unit 103 outputs an image (as a restored image) whose pixels have the values of [X] and stores this image in the memory (not shown) (see step S405).

Lastly, the image output unit 120 outputs the restored image, which was stored in the memory (not shown) by the image restoration unit 103, to a display device or the like (see step S406).

Below, the effect of the second embodiment for implementing the present invention will be explained.

In the second embodiment (for implementing the present invention), in addition to the operation of the first embodiment, the category classification unit 304 classifies the individual pixels of the input image into categories such as the flat region, the edge region, or the like, based on the direction and amount of variation in the pixel value from peripheral pixels, which (direction and amount) are stored by the variation computation unit 101 in the memory.

Additionally, the regularization strength computation unit 102a determines the regularization strength based on the information on the category for the individual pixels stored by the category classification unit 304 in the memory.

The image restoration unit 103 restores the image utilizing the regularization terms which are formed based on the regularization strength computed according to the relevant category.

Therefore, in the second embodiment, according to the results of category classification executed by the category classification unit 304, the regularization strength computation unit 102a assigns an optimum regularization strength to each pixel. The image restoration unit 103 then utilizes the optimum regularization strength of each pixel to generate an optimum restored image according to the results of category classification. Accordingly, in comparison with the first embodiment, it is possible to obtain a more accurate restored image.

Third Embodiment

Next, referring to FIG. 5, an image processing system in accordance with a third embodiment of the present invention will be explained. Here, structural elements similar to those in the first and second embodiments are given reference signs identical to those in FIGS. 1 and 3 and explanations thereof are omitted.

FIG. 5 is a block diagram showing an example of the image processing system in the third embodiment. The present image processing system has an image input unit 110, a computer 100b which operates utilizing a program control, and an image output unit 120.

Similar to the first and second embodiments, the computer 100b may be called a central processing unit, a processor, or a data processing unit.

The computer 100a includes a variation computation unit 101, a regularization strength computation unit 102a, an image restoration unit 103, a category classification unit 304b, a synthesis ratio computation unit 501, and an image synthesis unit 502

Since the image input unit 110, the variation computation unit 101, the image restoration unit 103, and the regularization strength computation unit 102a are similar to those in the first and second embodiments, explanations thereof are omitted.

Similar to the second embodiment, based on the direction and amount of the variation in the pixel value computed by the variation computation unit 101, the category classification unit 304b classifies the individual pixels into a plurality of categories predetermined by a user. The category classification unit 304b stores the classified results in the memory (not shown).

In the present embodiment, the category classification unit 304b also computes for each pixel, (a degree of) reliability for the relevant result of classification and stores the reliability in the memory (not shown).

Below, $S_i$ denotes reliability of the ith pixel and [S] denotes a column vector obtained by arranging the reliability values in raster scan order.

Similar to the second embodiment, when the variation computation unit 101 has stored the amount $dY_i$ and direction $[N]_i$ of the variation in the pixel value, the individual pixels of the input image are classified into two types of regions such as the flat region and the edge region according to the amount $dY_i$ of variation.

Next, the reliability $S_i$ is computed in a manner such that the greater the difference between thresholds $dY_0$ and $dY_i$, (utilized in the category classification), the less the reliability $S_i$.

For example, the value obtained by the following formula (25) may be utilized as reliability $S_i$.

[Formula 25]

$$S_i = |dY_i - dY_0|^{-1} \quad (25)$$

In another example, the reliability $S_i$ of a pixel may be computed in a manner such that the greater the degree of coincidence between the category assigned to the relevant pixel and categories assigned to its peripheral pixels, the greater the reliability $S_i$.

For example, regarding the results of category classification for eight neighboring pixels around the ith pixel, the reliability $S_i$ may be set to the number of the neighboring pixels that have the same result of category classification as that of the ith pixel.

In the following case to be explained, the variation computation unit 101 has stored, not only the amount $dY_i$ and direction $[N]_i$ of the variation in the pixel value, but also the vector $[E]$ that indicates presence or absence of the edge region.

Also in such a case, similar to the second embodiment, the individual pixels of the input image are classified into four types of regions such as the flat region, the texture region having no directionality, the texture region having a directionality, and the edge region, according to the computed values.

Next, the reliability $S_i$ is computed in a manner such that the greater the degree of coincidence between the category of the relevant pixel and categories assigned to its peripheral pixels, the greater the reliability $S_i$. For example, regarding the results of category classification for eight neighboring pixels around the ith pixel, the reliability $S_i$ is set to the number of the neighboring pixels that have the same result of category classification as that of the ith pixel.

The above-computed reliability $S_i$ indicates that the less the value of $S_i$, the higher the probability that the result of classification is wrong. When the result of classification is wrong, the regularization strength computation unit 102 does not compute an appropriate regularization strength, so that no accurate image is generated by the image restoration unit 103. Therefore, the pixel having a small reliability $S_i$ also has low reliability for the relevant pixel value in the restored image. That is, the reliability $S_i$ functions as, not only reliability for the classified result of the ith pixels, but also reliability for the restored image.

Based on the reliability [S] computed by the category classification unit 304b, the synthesis ratio computation unit 501 computes a synthesis ratio utilized in synthesis between the restored image and the input image, that is performed by the image synthesis unit 502 explained later, and stores the synthesis ratio in the memory (not shown). Below, $Q_i$ denotes the synthesis ratio of the ith pixel and [Q] denotes a column vector obtained by arranging the synthesis ratios in raster scan order, where the vector will be called a "synthesis ratio vector [Q]".

In the synthesis ratio vector [Q], the synthesis ratio $Q_i$ assigned to the ith pixel has a value within 0 to 1, where the greater the reliability $S_i$, the greater the synthesis ratio $Q_i$. $Q_i$ may be computed by the following formula (26).

[Formula 26]

$$Q_i = \sigma(\tau \cdot S_i) \quad (26)$$

Here, similar to the first embodiment, $\sigma(\cdot)$ is a function that outputs 1 if the input value (argument) is greater than 1, otherwise the function outputs the input value. Additionally, $\tau$ is a constant predetermined by a user.

Based on the synthesis ratio vector [Q] computed by the synthesis ratio computation unit 501, the input image Y input via the image input unit 110, and the restored image X restored by the image restoration unit 103, the image synthesis unit 502 generates a synthesized image and stores it in the memory (not shown). Below, $Z_i$ denotes the pixel value of the ith pixel in the synthesized image, and [Z] denotes a column vector obtained by arranging the pixel values in raster scan order.

The image synthesis unit 502 computes the individual pixel values of the restored image so as to generate the synthesized image that has (i) a region having a relatively high reliability $S_i$ (computed by the category classification unit 304b) where each pixel value in this region is close to the corresponding pixel value in the restored image and (ii) a region having a relatively low reliability $S_i$ where each pixel value in this region is close to the corresponding pixel value in the input image.

Specifically, the pixel value $Z_i$ of the ith pixel is computed as follows utilizing $X_i$, $Y_i$, and $Q_i$.

[Formula 27]

$$Z_i = Q_i \cdot X_i + (1-Q_i) \cdot Y_i \quad (27)$$

The image output unit 120 outputs the synthesized image stored in the memory (not shown).

Figure 6:
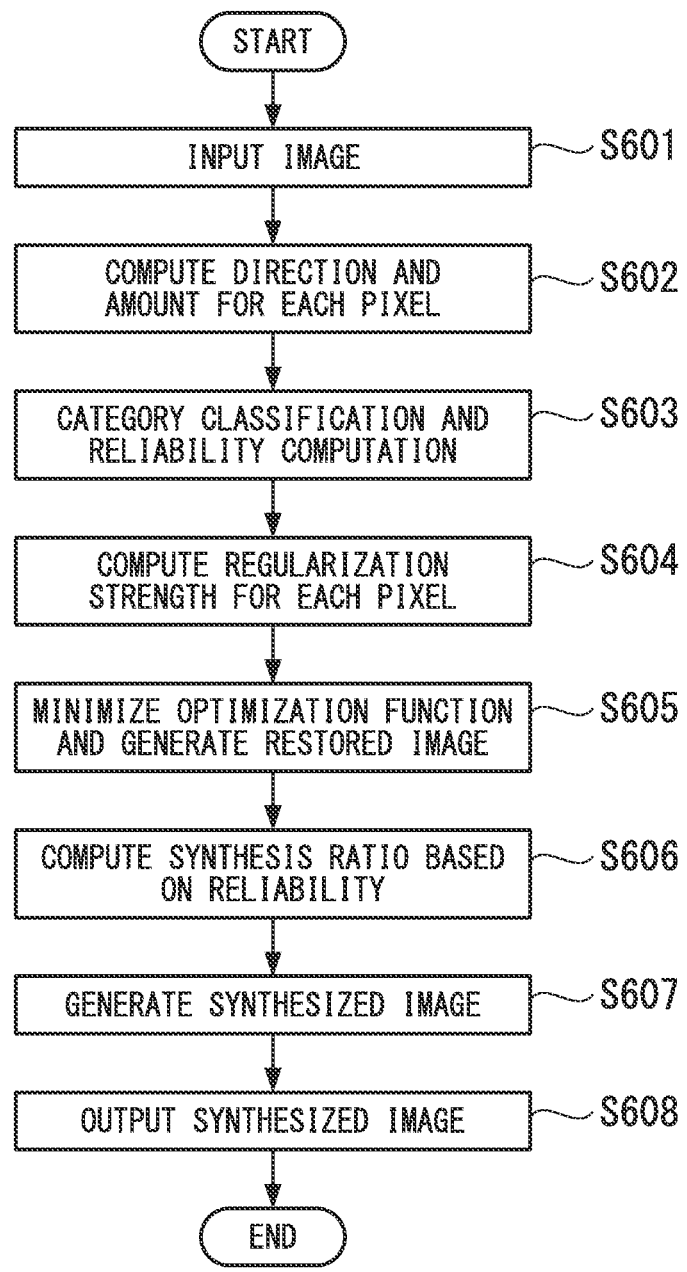
FIG. 6 is a flowchart that shows the operation of the third embodiment shown in FIG. 5.

Below, the general operation of the present embodiment will be explained in detail with reference to FIG. 5 and a flowchart in FIG. 6.

First, when an image is input into the image input unit 110, the image input unit 110 stores the input image in the memory (not shown) (see step S601).

Next, for the input image stored by the image input unit 110 in the memory (not shown), the variation computation unit 101 computes, for each pixel, a direction toward which the variation in the pixel value between the relevant pixel and its peripheral pixels is largest. The variation computation unit 101 also computes the amount of variation in the pixel value between the relevant pixel and its peripheral pixels. The variation computation unit 101 then stores, for each pixel of the input image, the direction (toward which the variation in the pixel value is large) and the amount of the relevant variation in the memory (not shown) (see step S602).

In addition to the direction of the variation between the relevant pixel and its peripheral pixels (toward which the variation is large) and the amount of the relevant variation, the variation computation unit 101 may compute the amount and direction for a larger scale or detect the edge segment in the relevant image and store the computed or detected result in the memory (not shown).

Next, the category classification unit 304b classifies the category of the individual pixels of the input image into the flat region and the edge region based on the direction unit vector [N] and the variation vector [dY] for the pixels, which were stored by the variation computation unit 101 in the memory (not shown), and stores the classified results in the memory (not shown).

The category classification unit 304b also computes the reliability based on the results of the category classification and stores the reliability in the memory (not shown) (see step S603).

Here, the category classification unit 304b may classify the individual pixels into the flat region, the texture region having no directionality, the texture region having a directionality, and the edge region based on the direction toward which the variation in the pixel value between each pixel (in the input image) and its peripheral pixels is largest and the amount of variation in the pixel value between the relevant pixel and its peripheral pixels, which were stored by the variation computation unit 101 in the memory (not shown).

Based on (i) the input image stored in the memory (not shown) by the image input unit 110, (ii) the direction toward which the variation in the pixel value between each pixel and its peripheral pixels is largest and the amount of variation in the pixel value between the relevant pixel and its peripheral pixels, which were stored in the memory (not shown) by the variation computation unit 101, and (iii) the category-classified results for the individual pixels of the input image stored by the category classification unit 304b in the memory (not shown), the regularization strength computation unit 102a computes the regularization strength for each pixel and stores the computed result in the memory (not shown) (see step S604).

Next, the image restoration unit 103 determines the optimization function based on the input image stored in the memory (not shown) by the image input unit 110 and the regularization strength (for each pixel of the input image) stored in the memory (not shown) by the regularization strength computation unit 102a. The image restoration unit 103 then computes, for the relevant optimization function E([X]), the value [X] that minimizes the value of function E([X]).

The image restoration unit 103 outputs an image (as a restored image) whose pixels have the values of [X] and stores this image in the memory (not shown) (see step S605).

Next, the synthesis ratio computation unit 501 computes the synthesis ratio based on the reliability computed by the category classification unit 304b (see step S606).

Based on the synthesis ratio computed by the synthesis ratio computation unit 501, the input image input via the image input unit 110, and the restored image restored by the image restoration unit 103, the image synthesis unit 502 generates a synthesized image based on the synthesis ratio and stores the synthesized image in the memory (not shown) (see step S607).

Lastly, the image output unit 120 outputs the synthesized image, which was stored in the memory (not shown) by the image synthesis unit 502, to a display device or the like (see step S608).

Below, the effect of the third embodiment for implementing the present invention will be explained.

In the third embodiment (for implementing the present invention), in addition to the operation of the second embodiment, the category classification unit 304b computes the reliability for each result of category classification based on the direction toward which the variation in the pixel value between each pixel and its peripheral pixels is largest and the amount of variation in the pixel value between the relevant pixel and its peripheral pixels, which were stored by the variation computation unit 101 in the memory.

In addition, the synthesis ratio computation unit 501 computes the synthesis ratio based on the reliability computed by the category classification unit 304b.

Based on the synthesis ratio computed by the synthesis ratio computation unit 501, the image synthesis unit 502 generates a synthesized image that has a region having a high reliability where each pixel value is close to the corresponding pixel value in the restored image and a region having a low reliability where each pixel value is close to the corresponding pixel value in the input image.

That is, in the third embodiment, according to the reliability computed by the category classification unit 304b, the image synthesis unit 502 generates the synthesized image that has a region having a high reliability where each pixel value is close to the corresponding pixel value in the restored image and a region having a low reliability where each pixel value is close to the corresponding pixel value in the input image. Therefore, in the third embodiment, the restoration is performed only in a region having high reliability so that a more accurate restored image can be obtained in comparison with the second embodiment.

Specific Example 1

Below, the operation of a best mode to implement the present invention will be explained utilizing specific examples.

Although the present invention are explained utilizing specific examples, the scope of the present invention is not limited to contents to be explained below. In addition, this example corresponds to the first embodiment. Below, FIG. 1 will be referred to in the relevant explanation.

In the present example, a video capture board that can input or output an NTSC (National Television System Committee) signal is utilized as the image input unit 110. In addition, a display device is utilized as the image output unit 120. Furthermore, an image processing board on which an image processing processor is mounted is utilized as the computer 100.

The video capture board converts an input video signal to a YUV signal and sends the converted signal to the image processing board. Additionally, when receiving a processing result obtained at and transferred from the image processing board, the video capture board converts the processing result to a video signal and makes it be displayed at the display device.

As described above, in the present example, the processing result obtained at the image processing board is transferred to the video capture board and the video capture board makes the relevant image be displayed at the display device.

The image processing board includes the variation computation unit 101, the regularization strength computation unit 102, and the image restoration unit 103.

When an input signal corresponding to the input image is input into the image input unit 110, the image input unit 110 stores the signal value into a memory or the like.

The variation computation unit 101 computes the direction toward which the variation in the pixel value between each pixel (in the input image) and its peripheral pixels is largest and the amount of variation in the pixel value between the relevant pixel and its peripheral pixels.

Below, similar to the first embodiment, $dY_i$ denotes the relevant amount of variation in the pixel value of the ith pixel, and a column vector (variation vector) that arranges the individual values in raster scan order is represented by:
$[dY]=(dY_1, \ldots, dY_i, \ldots, dY_N)$. In addition, the direction of the variation for the ith pixel is represented as a unit vector $[N]_i=(N_{xi}, N_{yi})$, and $[N]$ denotes a matrix (direction unit vector) obtained by arranging such unit vectors in raster scan order.

The variation computation unit 101 stores the variation vector $[dY]$ and the direction unit vector $[N]$ in a memory (not shown).

Below, a method of computing the variation vector $[dY]$ that indicates the variation in the pixel value will be explained in detail.

First, an image obtained by subjecting the input image to a product-sum operation utilizing a Gaussian filter is generated. Next, the input image which was subjected to the product-sum operation utilizing the Gaussian filter is further subjected to a product-sum operation utilizing a Laplacian filter arranged in the x and y directions. The pixel values of the individual pixels in the obtained image are arranged in raster scan order so as to acquire the column vectors $[Y_x]$ and $[Y_y]$.

The amount of variation $dY_i$ in the pixel value for pixel i is defined utilizing $Y_{xi}$ and $Y_{yi}$ as follows.

[Formula 28]

$$dY_i = (Y_{xi}^2 + Y_{yi}^2)^{\frac{1}{2}} \tag{28}$$

On the other hand, the method of computing the direction of the variation in the pixel value computes a direction toward which the pixel value has varied most based on the previously-computed amounts of variation in the pixel value in the x and y directions.

For example, regarding the direction of the variation in the pixel value of the ith pixel, the direction unit vector $[N]_i=(N_{xi}, N_{yi})$ is computed utilizing the amounts $Y_{xi}$, $Y_{yi}$, and $dY_i$ of variation in the pixel value for the ith pixel, as follows.

[Formula 29]

$$N_{xi} = \frac{Y_{xi}}{dY_i} \tag{29}$$

$$N_{yi} = \frac{Y_{yi}}{dY_i}$$

Next, the variation computation unit 101 utilizes the Canny edge detection algorithm to detect an edge segment in the input image and generates a mask image having a pixel value 1 that indicates the presence of the edge segment and a pixel value 0 that indicates the absence of the edge segment.

Then a column vector $[E]=(E_1, \ldots, E_i, \ldots, E_N)^t$ is obtained by arranging the values of individual pixels of an image, that is obtained by subjecting the above mask image to a product-sum operation utilizing a Gaussian filter, in raster scan order.

The variation computation unit 101 stores the computed $[dY]$, $[N]$, and $[E]$ in the memory (not shown).

The regularization strength computation unit 102 adaptively computes for each pixel, the regularization strength by which the larger the amount of the variation (toward the direction indicated by the direction unit vector $[N]$ computed by the variation computation unit 101) in the pixel value, the less the regularization strength. The regularization strength computation unit 102 performs storage of the computed result.

There are two types of regularization strength. When the number of pixels in the input image is M, the first and second regularization terms for pixel i are respectively represented by $W_{1i}$ and $W_{2i}$, and column vectors obtained by arranging the regularization strength values for each pixel in raster scan order are $[W]_1=(W_{11}, \ldots, W_{1i}, \ldots, W_{1M})^t$, and $[W]_2=(W_{21}, \ldots, W_{2i}, \ldots, W_{2M})^t$.

The regularization strength $W_{ki}$ for the ith pixel is defined as follows utilizing $[dY]$, $[N]$, and $[E]$ stored by the variation computation unit 101.

[Formula 30]

$$W_{1i}=\lambda+\beta\cdot\sigma(D\cdot|dY_i\cdot N_{xi}\cdot E_i+\epsilon|^{-1})$$

$$W_{2i}=\lambda+\beta\cdot\sigma(D\cdot|dY_i\cdot N_{yi}\cdot E_i+\epsilon|^{-1}) \tag{30}$$

Here, $\sigma(\cdot)$ is a function that outputs 1 if the input value is greater than 1, otherwise the function outputs the input value. Additionally, D and $\epsilon$ are constants predetermined by a user.

Based on the regularization strength computed by the regularization strength computation unit and the input image, the image restoration unit 103 determines the optimization function that includes the regularization term $E_{reg}([X])$ (determined in consideration of the direction) and the error term $E_{data}([X])$. The image restoration unit 103 utilizes the optimization function E to obtain the individual pixel values of a restored image [X] restored from the degraded image (i.e., input image [Y]).

In this process, the image restoration unit 103 may employ a gradient method or a conjugate gradient method as the method for searching for [X] which minimizes the optimization function E([X]) so as to obtain each pixel value of the restored image, and thereby the restored image can be generated.

The optimization function E([X]) may be as follows.

[Formula 31]

$$E(X) = E_{data}(X) + t \cdot E_{reg}(X) \qquad (31)$$

Here, t is a parameter predetermined by a user.

The error term $E_{data}([X])$ is a function that includes [Y], [X], and [B] where the higher the degree of matching between [X] and the restored image (i.e., the smaller the difference between the input image and the restored image), the less the value of the function.

The error term $E_{data}([X])$ may be predefined as the following relational expression (Formula (32)).

[Formula 32]

$$E_{data}(X) = |B \cdot X - Y|^2 \qquad (32)$$

Here, $\|\cdot\|$ indicates a norm of a vector, and Formula (19) indicates an Lp norm.

On the other hand, $E_{reg}([X])$ may be represented as the sum of the two regularization terms, as follows.

[Formula 33]

$$E_{reg}(X) = \{L_x \cdot X\}^t \cdot \mathrm{diag}(W_1) \cdot \{L_x \cdot X\} + \{L_y \cdot X\}^t \cdot \mathrm{diag}(W_2) \cdot \{L_y \cdot X\} \qquad (33)$$

Here, $[L]_x$ and $[L]_y$ indicate a Laplacian filter arranged in the x and y directions, and $[W]_1$ and $[W]_2$ are the regularization strength values computed by the regularization strength computation unit 102.

The image restoration unit 103 may employ a gradient method or a conjugate gradient method as the method for searching for [X] which minimizes the optimization function E([X]) and stores the individual pixel values of the restored image [X] in the memory (not shown).

Lastly, the image output unit 120 outputs the restored image, which was stored in the memory (not shown) by the image restoration unit 103, to a display device or the like.

INDUSTRIAL APPLICABILITY

In accordance with the present invention, it is possible to generate a restored image which maintains an image having a clear contour (edge) that indicates a boundary by which different regions in the image (e.g., different objects or figures present in the input image) are distinguishable.

REFERENCE SYMBOLS

100, 100a, 100b computer (central processing unit, processor, or data processing unit)
101 variation computation unit
102, 102a regularization strength computation unit
103 image restoration unit
304, 304b category classification unit
120 image output unit
501 synthesis ratio computation unit
502 image synthesis unit

The invention claimed is:

1. A degradation restoration system that generates a restored image based on an optimization function which includes a plurality of regularization terms, that reduce variation in pixel value of the restored image toward different directions assigned to the individual regularization terms, and an error term where the smaller the difference between an input image and an image obtained by virtually degrading the restored image in accordance with a pre-assumed degradation step, the less the value of the error term, wherein the system comprises:

a variation computation unit that computes, for each pixel of the input image, a direction toward which variation in pixel value between the relevant pixel and its peripheral pixels is largest and an amount of the variation in pixel value between the relevant pixel and its peripheral pixels, where the variation computation unit computes a direction unit vector that indicates, for each pixel, the direction toward which the variation is largest and a variation vector that represents, for each pixel, the amount of the largest variation between the relevant pixel and its peripheral pixels;

a regularization strength computation unit that computes, for each pixel, a regularization strength utilizing the direction unit vector, the variation vector, and a regularization strength computing formula in a manner such that the greater the degree of coincidence between a direction toward which each regularization term reduces the variation in pixel value and a direction of the variation in pixel value, which is indicated by the direction unit vector computed by the variation computation unit, and also the larger the amount of the variation in pixel value, the less the regularization strength; and an image restoration unit that determines the optimization function based on the input image and the regularization strength assigned to each pixel of the input image and assigns a value for each pixel, by which the determined optimization function has a minimum value, to the corresponding pixel of the restored image so as to generate the restored image.

2. The degradation restoration system in accordance with claim 1, wherein:

the individual regularization terms reduce, not only the variation in pixel value of the restored image toward the different directions, but also variation in pixel value of the restored image for different scales assigned to the individual regularization terms; and the variation computation unit computes, for each pixel, the amount of the variation in pixel value between the relevant pixel and its peripheral pixels for the different scales; and in the computation manner of the regularization strength computation unit, not only the greater the degree of coincidence between the direction toward which each regularization term reduces the variation in pixel value and the direction of the variation in pixel value indicated by the direction unit vector computed by the variation computation unit and the larger the amount of the variation in pixel value, the less the regularization strength, but also the larger the scale determined by the variation computation unit, the less the regularization strength.

3. The degradation restoration system in accordance with claim 1, further comprising:
- a category classification unit that classifies the individual pixels of the input image into a plurality of predetermined categories,
- wherein the regularization strength computation unit appropriately computes, for each pixel, the regularization strength in accordance with the category into which the pixel was classified by the category classification unit in a manner such that the larger the variation in pixel value toward the direction computed by the variation computation unit, the less the regularization strength.

4. The degradation restoration system in accordance with claim 3, wherein:
- the category classification unit classifies the individual pixels of the input image into the predetermined categories and computes reliability for each result of the category classification; and
- the system further comprises:
- a synthesis ratio computation unit that computes a synthesis ratio between the restored image and the input image based on the reliability computed by the category classification unit; and
- an image synthesis unit that generates a synthesized image based on the input image input via an image input unit, the restored image restored by the image restoration unit, and the synthesis ratio computed by the synthesis ratio computation unit so that in the synthesized image, only a region having a relatively high degree of reliability is close to the corresponding region in the restored image.

5. A degradation restoration method utilized in a degradation restoration system that generates a restored image based on an optimization function which includes a plurality of regularization terms and an error term, wherein:
- a variation computation step comprising computing, for each pixel of an input image, a direction toward which variation in pixel value between the relevant pixel and its peripheral pixels is largest and an amount of the variation in pixel value between the relevant pixel and its peripheral pixels, where the variation computation unit computes a direction unit vector that indicates, for each pixel, the direction toward which the variation is largest and a variation vector that represents, for each pixel, the amount of the largest variation between the relevant pixel and its peripheral pixels;
- a regularization strength computation step comprising computing, for each pixel, a regularization strength utilizing the direction unit vector, the variation vector, and a regularization strength computing formula in a manner such that the larger the amount of the variation in pixel value toward a direction indicated by the direction unit vector computed by the variation computation unit, the less the regularization strength; and
- an image restoration step comprising determining the optimization function based on the input image and the regularization strength assigned to each pixel of the input image and assigns a value for each pixel, by which the determined optimization function has a minimum value, to the corresponding pixel of the restored image so as to generate the restored image.

6. A non-transitory computer-readable medium having a program stored thereon that makes a computer in a degradation restoration system, that generates a restored image based on an optimization function which includes a plurality of regularization terms and an error term, execute:
- a variation computation step that computes, for each pixel of an input image, a direction toward which variation in pixel value between the relevant pixel and its peripheral pixels is largest and an amount of the variation in pixel value between the relevant pixel and its peripheral pixels, where the variation computation step computes a direction unit vector that indicates, for each pixel, the direction toward which the variation is largest and a variation vector that represents, for each pixel, the amount of the largest variation between the relevant pixel and its peripheral pixels;
- a regularization strength computation step that computes, for each pixel, a regularization strength utilizing the direction unit vector, the variation vector, and a regularization strength computing formula in a manner such that the larger the amount of the variation in pixel value toward a direction indicated by the direction unit vector computed by the variation computation step, the less the regularization strength; and
- an image restoration step that determines the optimization function based on the input image and the regularization strength assigned to each pixel of the input image and assigns a value for each pixel, by which the determined optimization function has a minimum value, to the corresponding pixel of the restored image so as to generate the restored image.

\* \* \* \* \*